UNITED STATES PATENT OFFICE.

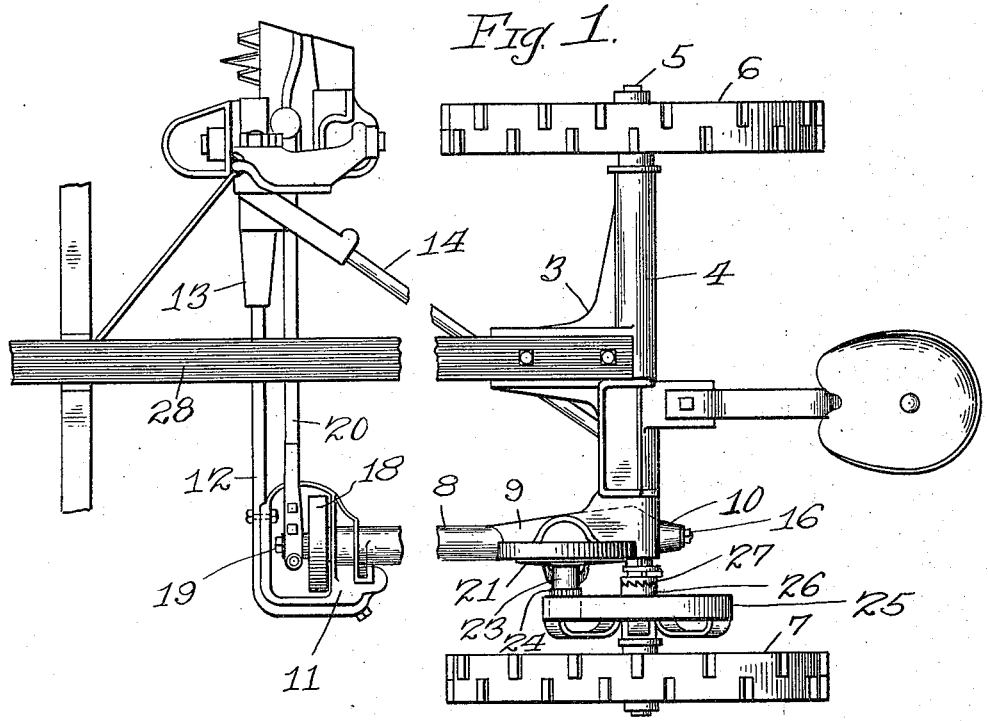
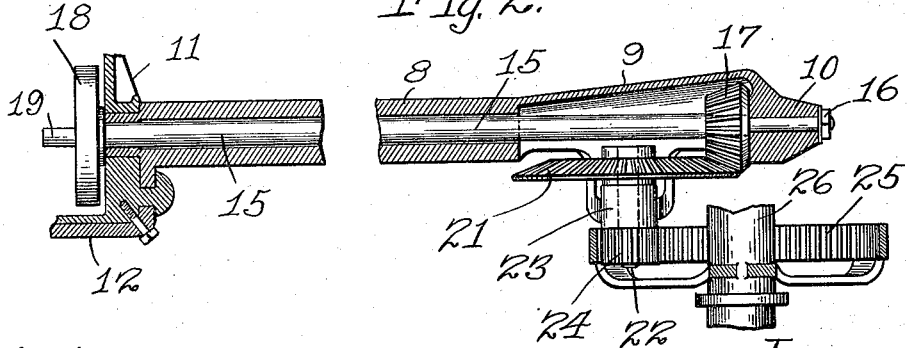

JOSEPH DAIN, OF MOLINE, ILLINOIS, ASSIGNOR, BY MESNE ASSIGNMENTS, TO DEERE & COMPANY, OF MOLINE, ILLINOIS, A CORPORATION OF ILLINOIS.

MOWER.

1,147,709.  Specification of Letters Patent.  Patented July 27, 1915.

Original application filed November 2, 1905, Serial No. 285,592. Divided and this application filed January 5, 1914. Serial No. 810,387.

*To all whom it may concern:*

Be it known that I, JOSEPH DAIN, a citizen of the United States, residing at Moline, in the county of Rock Island and State of Illinois, have invented certain new and useful Improvements in Mowers, of which the following is a specification, reference being had to the accompanying drawings.

My invention relates to mowers of the type in which the cutter-bar is reciprocated by a pitman extending transversely across the front of the machine and operated by a crank-shaft which extends longitudinally of the machine,—that is to say, fore and aft. A mower of this type is shown and described in my pending application, Serial No. 285,592, filed November 2, 1905, of which this application is a division.

The object of my present invention is to provide improved mechanism for supporting the crank-shaft and for driving the same from the main axle. I accomplish this object as illustrated in the accompanying drawings and as hereinafter described.

What I regard as new is set forth in the claims.

In the accompanying drawings, Figure 1 is a plan view, partly broken away, showing the principal parts of a mower equipped with my improvements; and Fig. 2 is a sectional view showing the crank-shaft and driving mechanism more in detail.

Referring to the drawings, 3 indicates the main frame of the mower which is provided at the rear with a transversely-disposed sleeve 4, through which passes the main axle 5.

6—7 indicate the usual carrying wheels which are mounted upon the rear axle 5 in the usual way.

8 indicates a sleeve rigid with the frame 3, which is preferably cast as an integral part of said frame and extends fore and aft adjacent to the wheel 7, said sleeve being connected to the sleeve 4 by a housing 9 cylindrical in form, as best shown in Fig. 2.

10 indicates a boss which is joined to the rear end of the housing 9 and extends back of the sleeve 4, as shown in Fig. 1. The forward end of the sleeve 8 is detachably connected with a casting 11 to which is secured one end of a drag-bar 12, which extends transversely of the machine, as shown in Fig. 1. The opposite end of the drag-bar is fitted in a bracket 13, which is also connected to a diagonal brace 14, as shown in Fig. 1, the opposite end of said brace being connected with the frame 3.

15 indicates the crank-shaft by which the cutter-bar is reciprocated. As best shown in Fig. 2, said shaft is mounted in the sleeve 8, its forward end being journaled in a suitable bearing provided in the casting 11, while its rear end is journaled in the boss 10 through which it extends.

16 indicates a nut screwed upon the rear end of the shaft 15 and bearing against the boss 10.

17 indicates a beveled pinion mounted on the shaft 15 at the opposite side of the boss 10 from the nut 16, or, in other words, within the housing 9. A portion of the periphery of said pinion is, however, exposed through an open side of said housing, as shown in Fig. 2.

18 indicates a disk which is mounted upon the forward end of the shaft 15 adjacent to the front bearing of said shaft and is provided with a wrist pin 19 to which is connected a pitman 20, which reciprocates the cutter-bar in the usual way.

21 indicates a beveled gear mounted upon a shaft 22 disposed transversely of the machine, said shaft being mounted in a bearing 23. The gear 21 meshes with the pinion 17 and through said pinion drives the shaft 15.

24 indicates a spur-wheel mounted on the shaft 22 at the opposite side of the bearing 23 from the gearing 21, said spur-wheel meshing with an internal gear 25 mounted on a sleeve 26, which is in turn loosely mounted on the axle 5. The sleeve 26 forms one member of a clutch, of which 27 is the co-acting member, said member 27 being also mounted on the axle 5. The clutch member 27 is movable longitudinally into and out of engagement with the clutch member 26 and is connected with the axle 5 so as to rotate therewith.

28 indicates the tongue, which is rigidly secured to the frame 3, as shown in Fig. 1.

From the foregoing description it will be seen that when the machine is advancing and the clutch members 26—27 are in engagement with each other, the gear 25 is rotated, thereby driving the pinion 24 and the beveled gear 21, the latter driving the pinion 17 and the crank-shaft 15, thereby operating the cutter-bar. By mounting the crank-shaft 15 in the manner described it is supported at both ends and the driving strain is sustained by it between its ends and practically in line with the axle of the machine, thus providing a very strong and serviceable construction. By mounting the crank-shaft in a sleeve rigid with the main frame, it is held in fixed relation to the tongue, and consequently the crank-shaft is prevented from vibrating or swinging vertically independently of the tongue. Furthermore, by arranging the shaft 22 and its gears in the manner described the inward thrust upon the pinion 24 neutralizes the outward thrust on the gear 21, thus practically balancing said shaft and relieving it of undue strain. The clutch member 27 may be moved out of engagement with the clutch member 26 by any suitable mechanism, operated either manually or automatically, as described in my said application.

What I claim as my invention, and desire to secure by Letters Patent, is,—

1. In a mower, the combination of a frame, comprising a forwardly-extending sleeve rigid therewith, a shaft mounted in said sleeve, front and rear bearings for said shaft, a pinion mounted on said shaft between said bearings, gearing for driving said shaft, and a pitman actuated by said shaft.

2. In a mower, the combination of an axle, a housing for said axle, a sleeve rigidly connected with said housing and extending forward from the axle, a shaft mounted in said sleeve, a rear bearing for said shaft adjacent to the axle, a front bearing for said shaft, a pinion mounted on said shaft between said bearings, and gearing adapted to be driven from said axle and meshing with said pinion for driving said shaft.

3. In a mower, the combination of an axle, a main frame supported on said axle, a forwardly-extending sleeve forming a part of said main frame and rigid therewith, a shaft mounted in said sleeve, front and rear bearings for said shaft, a pinion mounted on said shaft between said bearings, and gearing adapted to be connected with the axle for driving said pinion.

4. In a mower, the combination of an axle, a main frame supported on said axle, a forwardly-extending sleeve forming a part of said main frame and rigid therewith, a shaft mounted in said sleeve, front and rear bearings for said shaft, a pinion mounted on said shaft between said bearings, and gearing adapted to be connected with the axle for driving said pinion, said gearing comprising a gear meshing with said pinion, a shaft on which said gear is mounted, a spur pinion mounted on the latter shaft, and an internal gear meshing with said spur pinion.

5. In a mower, the combination of an axle, a housing for said axle, a sleeve rigidly connected with said housing and extending forward therefrom, a boss connected with said housing and extending rearwardly therefrom, a shaft mounted in said sleeve and having a bearing in said boss, a front bearing for said shaft, a pinion mounted on said shaft between its ends, and gearing for driving said shaft from the axle.

6. In a mower, the combination of an axle, a housing for said axle, a sleeve rigidly connected with said housing and extending forward therefrom, a boss connected with said housing and extending rearwardly therefrom, a shaft mounted in said sleeve and having a bearing in said boss, a front bearing for said shaft, a pinion mounted on said shaft between its ends, gearing for driving said shaft from the axle, and a nut screwed upon the rear end of the shaft and bearing against said boss.

7. In a mower, the combination of a machine frame, a finger-bar, a cutter-bar, a drive-shaft extending longitudinally of the machine, means connected with said drive-shaft for reciprocating said cutter-bar, a beveled pinion mounted on said drive-shaft between the ends thereof, the rear end portion of said drive-shaft being journaled in the machine frame back of said beveled pinion, a front bearing for said drive-shaft, a beveled gear meshing with said pinion, a spur-gear, an internal gear meshing with said spur-gear, and means for driving said internal-gear by the forward motion of the machine.

JOSEPH DAIN.

Witnesses:
  JESSIE L. SIMSER,
  W. G. DUFFIELD.

Copies of this patent may be obtained for five cents each, by addressing the "Commissioner of Patents, Washington, D. C."